United States Patent
Kodaka et al.

(10) Patent No.: US 9,429,171 B2
(45) Date of Patent: Aug. 30, 2016

(54) HYDRAULIC CONTROL DEVICE OF WHEELED INDUSTRIAL VEHICLE

(71) Applicant: Hitachi Construction Machinery Co., Ltd., Bunkyo-ku, Tokyo (JP)

(72) Inventors: Katsuaki Kodaka, Tsuchiura (JP); Kentaro Itoga, Tsuchiura (JP); Kazuhiro Ichimura, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 272 days.

(21) Appl. No.: 14/372,677

(22) PCT Filed: Oct. 5, 2012

(86) PCT No.: PCT/JP2012/075982
§ 371 (c)(1),
(2) Date: Jul. 16, 2014

(87) PCT Pub. No.: WO2013/108445
PCT Pub. Date: Jul. 25, 2013

(65) Prior Publication Data
US 2015/0020514 A1 Jan. 22, 2015

(30) Foreign Application Priority Data
Jan. 17, 2012 (JP) .................... 2012-007321

(51) Int. Cl.
*F16D 31/02* (2006.01)
*F15B 1/027* (2006.01)
(Continued)

(52) U.S. Cl.
CPC ............. *F15B 1/027* (2013.01); *B60T 13/141* (2013.01); *B60T 13/662* (2013.01); *B60T 13/686* (2013.01);
(Continued)

(58) Field of Classification Search
CPC ........ F15B 1/022; F15B 1/024; F15B 1/027; B60T 13/14; B60T 13/141; B60T 13/686; E02F 9/2217
See application file for complete search history.

(56) References Cited

U.S. PATENT DOCUMENTS 4,441,573 A * 4/1984 Carman ................... B60K 6/12
60/416
4,959,962 A * 10/1990 Hagin ................. F02N 11/0825
60/626

FOREIGN PATENT DOCUMENTS

JP         2002-89506 A       3/2002
JP         2003-160045 A      6/2003

OTHER PUBLICATIONS

Corresponding International Search Report dated Jan. 22, 2013 with English Translation (three (3) pages).

*Primary Examiner* — Michael Leslie
(74) *Attorney, Agent, or Firm* — Crowell & Moring LLP

(57) ABSTRACT

An object is to reduce a load acting on an engine upon starting up the engine such that the engine can be quickly started up to reliably feed pressure oil from a hydraulic pump to an accumulator. A hydraulic control system is provided with first accumulators (24,25) connected to a hydraulic pump (23) via a first line (28) and second accumulators (26,27) connected to a second line (29) branching from the first line (28), an on/off valve (32) arranged in the second line and interposed between the first line (28) and the second accumulators (26,27), an operation detection device (41) for detecting whether or not a starter (22) is in an operation state, a rotational frequency detection device (a rotary encoder (47) and rotational frequency calculation device (43)) for detecting a rotational frequency of an engine (21), and a valve control device for, upon detection of the operation state of the starter (22) by the operation detection device (41), controlling a valve position of the on/off valve (32) at a closed position until the rotational frequency reaches an idling rotational frequency set beforehand but then controlling the valve position of the on/off valve (32) at a closed position.

8 Claims, 4 Drawing Sheets

(51) Int. Cl.
  *E02F 9/20* (2006.01)
  *E02F 9/22* (2006.01)
  *F02D 29/04* (2006.01)
  *B60T 13/14* (2006.01)
  *F15B 1/04* (2006.01)
  *B60T 13/66* (2006.01)
  *B60T 13/68* (2006.01)

(52) U.S. Cl.
  CPC ........... *E02F 9/2066* (2013.01); *E02F 9/2217* (2013.01); *E02F 9/2246* (2013.01); *F02D 29/04* (2013.01); *F15B 1/04* (2013.01)

KEY SWITCH

ON/OFF VALVE

ENGINE ROTATIONAL FREQUENCY (rpm)

PUMP PRESSURE (Mpa)

CHARGE PRESSURE (Mpa)

HYDRAULIC CONTROL DEVICE OF WHEELED INDUSTRIAL VEHICLE

TECHNICAL FIELD

This invention relates to a hydraulic control system for a wheeled working vehicle, which travels on wheels and stores, in an accumulator, pressure oil to be fed to a hydraulic bake system that applies braking to the wheels.

BACKGROUND ART

A hydraulic control system for a wheeled working vehicle, which travels on wheels, is provided with an engine, a starter for starting up the engine in association with a manipulation of a key switch, a hydraulic pump drivable by the engine, an accumulator for storing pressure oil therein by being fed with pressure oil delivered from the hydraulic pump, and a hydraulic brake system for applying braking to the wheels by being fed with the pressure oil stored in the accumulator. Conventional hydraulic control systems of this type include those provided with a hydraulic circuit that upon starting up an engine, stops feeding pressure oil from a hydraulic pump to an accumulator to reduce a load acting on the engine (see Patent Document 1).

PRIOR ART DOCUMENT

Patent Document

Patent Document 1: JP-A-2002-89506

DISCLOSURE OF THE INVENTION

Problem to be Solved by the Invention

As mentioned above, these conventional hydraulic control systems are provided with a hydraulic circuit that upon starting up an engine, stops feeding pressure oil from a hydraulic pump to an accumulator. As this hydraulic circuit includes a selector valve interposed between the hydraulic pump and the accumulator, there is a potential problem of occurrence of a situation in which the feeding of pressure oil from the hydraulic pump to the accumulator cannot be done in a normal operation state other than the time of a start-up of the engine, for example, if the selector valve develops a malfunction such as sticking.

With the foregoing circumstance in view, the present invention has as an object thereof the provision of a hydraulic control system for a wheeled working vehicle which upon starting up an engine, can reduce a load acting on the engine to quickly start up the engine, and also, to reliably feed pressure oil from a hydraulic pump to an accumulator.

Means for Solving the Problem

To achieve the above-mentioned object, a hydraulic control system according to the present invention for a wheeled working vehicle is configured as will be described next.

[1] In one aspect of the present invention, the hydraulic control system is applicable to the wheeled working vehicle provided with an engine, a starter for starting up the engine, a hydraulic pump drivable by the engine, an accumulator for storing pressure oil therein by being fed with hydraulic oil delivered from the hydraulic pump, a brake system for applying braking to wheels by the pressure oil stored in the accumulator, and a brake valve for controlling the pressure oil to be fed to the brake system; and is characterized in that it is provided with a first accumulator connected, as the accumulator, to a first line connecting the hydraulic pump and the brake valve to each other, a second accumulator connected, as the accumulator, to a second line branching from the first line at a point between the hydraulic pump and the first accumulator, an operation detection device for detecting whether or not the starter is in an operation state, a rotational frequency detection device for detecting a rotational frequency of the engine, an on/off valve arranged in the second line and switchable in valve position to an open position, where the first line and the second accumulator are communicated to each other, or a closed position, where the first line and the second accumulator are cut off from each other, and a valve control device for controlling the on/off valve based on the operation state of the starter as detected by the operation detection device and the rotational frequency of the engine as detected by the rotational frequency detection device, and upon detection of the operation state of the starter by the operation detection device, the valve control device controls the valve position of the on/off valve at the closed position until the rotational frequency of the engine as detected by the rotational frequency detection device reaches a preset rotational frequency set beforehand, but controls the valve position of the on/off valve at the open position after the rotational frequency of the engine has reached the preset rotational frequency.

In the hydraulic control system described above in [1], upon detection of the operation state of the starter by the operation detection device, the valve control device controls the valve position of the on/off valve at the closed position until the rotational frequency of the engine as detected by the rotational frequency detection device reaches the preset rotational frequency set beforehand. As a consequence, no pressure oil flows from the first line into the second line, and the hydraulic oil delivered from the hydraulic pump is fed to only the first accumulator out of the first and second accumulators.

Described specifically, upon starting up the engine, the hydraulic control system described above in [1] feeds the hydraulic oil, which has been delivered from the hydraulic pump, to only the first accumulator out of the first and second accumulators until the rotational frequency of the engine reaches the preset rotational frequency set beforehand, thereby enabling to reduce a load acting on the hydraulic pump compared with a case of simultaneous feeding of the hydraulic oil, which has been delivered from the hydraulic pump, to both the first and second accumulators, and hence, enabling to reduce the load acting on the engine and to start up the engine quickly.

In the hydraulic control system described above in [1], it is only the second accumulator out of the first and second accumulators that the hydraulic oil delivered from the hydraulic pump becomes unable to be fed when the valve position of the on/off valve is the closed position. Even if the on/off valve should stick at the closed position, the hydraulic oil delivered from the hydraulic pump can, therefore, be still fed to the first accumulator although it becomes impossible to feed the hydraulic oil to the second accumulator. Accordingly, the hydraulic control system described above in [1] can reliably perform the feeding of pressure oil from the hydraulic pump to the accumulator.

[2] In another aspect of the present invention, the hydraulic control system is applicable to the wheeled working vehicle provided with an engine, a starter for starting up the engine, a hydraulic pump drivable by the engine, an accumulator for storing pressure oil therein by being fed with hydraulic oil delivered from the hydraulic pump, a brake system for applying braking to wheels by the pressure oil stored in the accumulator, and a brake valve for controlling the pressure oil to be fed to the brake system, and is characterized in that it is provided with a first accumulator connected, as the accumulator, to a first line connecting the hydraulic pump and the brake valve to each other, a second accumulator connected, as the accumulator, to a second line branching from the first line at a point between the hydraulic pump and the first accumulator, an operation detection device for detecting whether or not the starter is in an operation state, an on/off valve arranged in the second line and switchable in valve position to an open position, where the first line and the second accumulator are communicated to each other, or a closed position, where the first line and the second accumulator are cut off from each other, and a valve control device for controlling the on/off valve based on the operation state of the starter as detected by the operation detection device, and the valve control device controls the valve position of the on/off valve at the closed position upon detection of the operation state of the starter by the operation detection device, but controls the valve position of the on/off valve at the open position while the operation state of the starter is not detected.

In the hydraulic control system described above in [2], while the operation state of the starter is detected by the operation detection device, the valve control device controls the valve position of the on/off valve at the closed position. With the valve position of the on/off valve being controlled at the closed position, no pressure oil flows from the first line into the second line, and the hydraulic oil delivered from the hydraulic pump is fed to only the first accumulator out of the first and second accumulators.

As a consequence, upon starting up the engine, the hydraulic control system described above in [2] feeds the hydraulic oil, which has been delivered from the hydraulic pump, to only the first accumulator out of the first and second accumulators while the starter is in the operation state, thereby enabling to reduce the load acting on the hydraulic pump compared with a case of simultaneous feeding of the hydraulic oil, which has been delivered from the hydraulic pump, to both the first and second accumulators, and hence, enabling to reduce the load acting on the engine and to start up the engine quickly.

In the hydraulic control system described above in [2], it is only the second accumulator out of the first and second accumulators that the hydraulic oil delivered from the hydraulic pump becomes unable to be fed when the valve position of the on/off valve is the closed position. Even if the on/off valve should stick at the closed position, the hydraulic oil delivered from the hydraulic pump can, therefore, be still fed to the first accumulator although it becomes impossible to feed the hydraulic oil to the second accumulator. Accordingly, the hydraulic control system described above in [2] can reliably perform the feeding of pressure oil from the hydraulic pump to the accumulator.

[3] The hydraulic control system according the present invention may be characterized in that in the hydraulic control system described above in [1] or [2], the hydraulic control system is further provided with a hydraulic oil temperature detection device for detecting a temperature of the hydraulic oil delivered from the hydraulic pump and a temperature determination device for determining whether or not the temperature detected by the hydraulic oil temperature detection device is lower than a predetermined temperature, and the valve control device controls the valve position of the on/off valve at the closed position when the operation state of the starter has been detected by the operation detection device and the temperature of the hydraulic oil has been determined to be lower than the predetermined temperature by the temperature determination device.

The viscosity of hydraulic oil depends on its temperature. As the temperature of the hydraulic oil decreases, its viscosity hence increases so that the load acting on the engine upon its start-up increases. In the hydraulic control system described above in [3], the predetermined temperature is set based on whether or not it is a temperature of the hydraulic oil at which the viscosity of the hydraulic oil affects the start-up of the engine. Upon starting up the engine, the hydraulic control system described above in [3], therefore, can reduce the load acting on the engine by controlling the valve position of the on/off valve to the closed position when the viscosity of the hydraulic oil affects the start-up of the engine (when the temperature of the hydraulic oil is a temperature lower than the predetermined temperature), but can allow the second accumulator to store pressure oil, without reducing the load acting on the engine, by controlling the valve position of the on/off valve to the open position instead of the closed position when the viscosity of the hydraulic oil does not affect the start-up of the engine (when the temperature of the hydraulic oil is a temperature equal to or higher than the predetermined temperature).

[4] The hydraulic control system according to the present invention may be characterized in that in the invention as described above in any one of [1] to [3], a proportion of a capacity of the first accumulator, which accounts for a total capacity of the first and second accumulators, is in a range that the capacity of the first accumulator can actuate the hydraulic brake system a predetermined number of times which is once or more, and is set smaller than a proportion of a capacity of the second accumulator, which accounts for the total capacity.

The hydraulic control system described above in [4] can reduce the load acting on the engine without decreasing the total capacity of the first and second accumulators upon feeding the hydraulic oil, which has been delivered from the hydraulic pump, to only the first accumulator out of the first and second accumulators.

Advantageous Effects of the Invention

According to the hydraulic control system of the present invention for the wheeled working vehicle, it is possible, upon starting up the engine, to reduce a load acting on the engine to quickly start up the engine, and also, to reliably feed pressure oil from the hydraulic pump to the accumulator.

MODES FOR CARRYING OUT THE INVENTION

A description will be made about hydraulic control systems according to first and second embodiments of the present invention for a wheeled working vehicle.

First Embodiment

Figure 1:
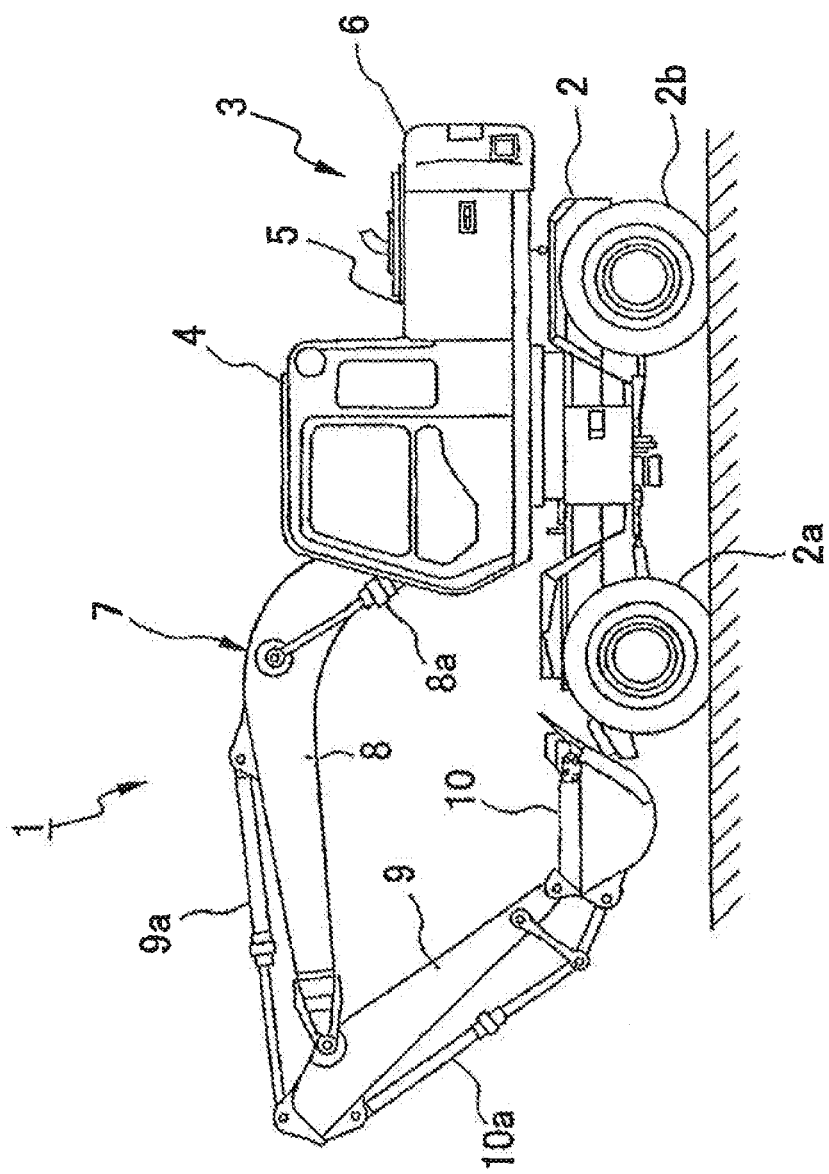
FIG. 1 is a side view of a wheeled hydraulic excavator as a wheeled working vehicle on which a hydraulic control system according to a first embodiment of the present invention is arranged.
Figure 2:
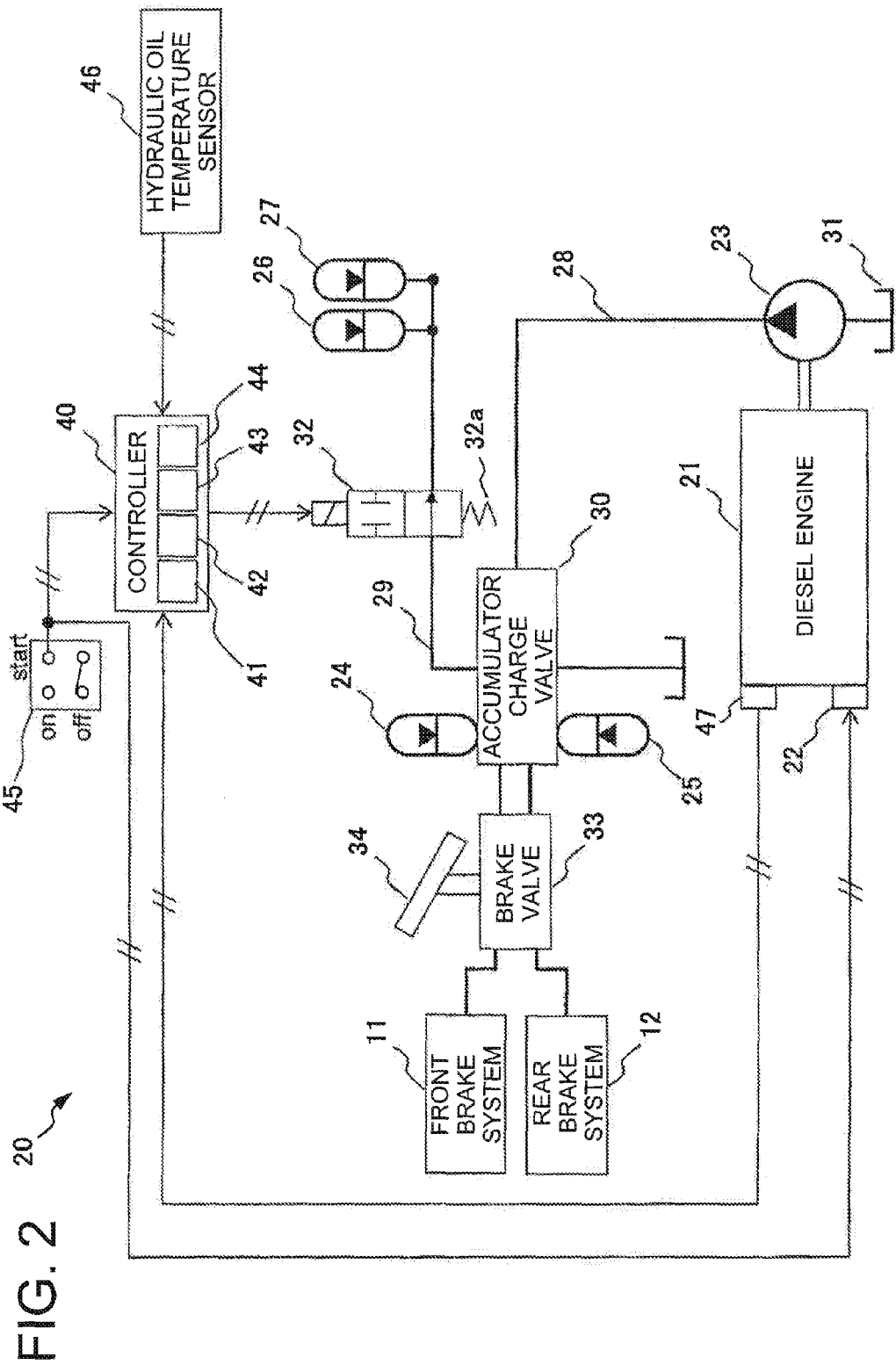
FIG. 2 is a hydraulic circuit diagram showing the hydraulic control system according to the first embodiment of the present invention.

With reference to FIGS. 1 to 3, a description will be made about the hydraulic control system according to the first embodiment for the wheeled working vehicle.

A wheeled hydraulic excavator 1 shown in FIG. 1 is provided with a travel base 2 having a pair of left and right front wheels 2a and a pair of left and right rear wheels 2b, an upperstructure 3 turnably connected to an upper section of the travel base 2, and a front working device 7 equipped on a front section of the upperstructure 3. The upperstructure 3 is provided with a cab 4 arranged on a left side of the front working device 7, an engine compartment 5 arranged behind the cab 4, and a counterweight 6 arranged behind the engine compartment 5. The front working device 7 is provided with a boom 8 tiltably connected to the upperstructure 3, an arm 9 pivotally connected to a free end portion of the boom 8, and a bucket 10 pivotally connected to a free end portion of the arm 9. These boom 8, arm 9 and bucket 10 are configured to be drivable by extension and retraction of a boom cylinder 8a (hydraulic cylinder), arm cylinder 9a (hydraulic cylinder) and bucket cylinder 10a (hydraulic cylinder), respectively.

The wheeled hydraulic excavator 1 is provided with a front brake system 11 (hydraulic brake system) for applying braking to the front wheels 2a, and a rear brake system 12 (hydraulic brake system) for applying braking to the rear wheels 2b. The hydraulic control system 20 according to the first embodiment of the present invention controls these front brake system 11 and rear brake system 12, and is provided with a diesel engine 21 which is an internal combustion engine, a starter 22 for starting up the diesel engine 21, a hydraulic pump 23 drivable by an output transmitted from the diesel engine 21, and first accumulators 24,25 and second accumulators 26,27 for storing therein hydraulic oil delivered and fed from the hydraulic pump 23.

The first accumulator 24 stores pressure oil, which is to be used for driving the front brake system 11, therein by being fed with hydraulic oil delivered from the hydraulic pump 23. The first accumulator 25 stores pressure oil, which is to be used for driving the rear brake system 12, therein by being fed with hydraulic oil delivered from the hydraulic pump 23. These first accumulators 24,25 are connected to the hydraulic pump 23 via a first line 28. The first line 28 is provided with an accumulator charge valve 30. The accumulator charge valve 30 is provided with a check valve (not shown) and a pressure control valve (not shown). The check valve allows a flow of pressure oil directed from the hydraulic pump 23 toward the first accumulators 24,25, but prevents a flow of pressure oil in a direction opposite to the first-mentioned flow. On the other hand, the pressure control valve similarly allows a flow of pressure oil directed from the hydraulic pump 23 toward the first accumulator 25, but drains pressure oil inside the first line 28 to a hydraulic oil tank 31 when the pressure (hereinafter called "the charge pressure") stored in the first accumulators 24,25 and second accumulators 26,27 has increased to a predetermined pressure (for example, 20 Mpa) or higher.

The second accumulators 26,27 are connected to a second line 29 branching from the first line 28. The hydraulic control system 20 is also provided with an on/off valve 32 arranged in the second line 29 and interposed between the first line 28 and the second accumulators 26,27. The on/off valve 32 has two valve positions, one being an open position (the lower valve position in FIG. 2) and the other a closed position (the upper valve position in FIG. 2). Described specifically, the hydraulic oil delivered from the hydraulic pump 23 is fed to the second accumulators 26,27 when the valve position of the on/off valve 32 is the closed position, while the feeding of the hydraulic oil, which has been delivered from the hydraulic pump 23, to the second accumulators 26,27 is prevented when the valve position of the on/off valve 32 is the closed position. The on/off valve 32 is a spring return electric valve, and the normal position of the on/off valve 32 is set at the open position by its return spring 32a.

The pressure oil stored in the first accumulators 24,25 and second accumulators 26,27 can be fed to the front brake system 11 or rear brake system 12 via a brake valve 33 interlocked with a brake pedal 34.

The hydraulic control system 20 is also provided with a controller 40 for controlling the on/off valve 32, and also with a key switch 45. The key switch 45 is selectively manipulated to 3 positions, i.e., an off position (Off), an on position (On) and a start-up position (Start). With the key switch 45 having been switched to the on position or start-up position, electric power is fed to the controller 40. With the key switch 45 being held at the start-up position, the starter 22 is brought into an operation state. The key switch 45 is configured to return from the start-up position to the on position by itself.

The controller 40 is a microcomputer equipped with CPU, ROM and RAM, and is provided with an operation detection device 41 set by a control program. Based on whether or not the key switch 45 is in a state that it has been manipulated to the start-up position, this operation detection device 41 detects whether or not the starter 22 is in the operation state.

As a hydraulic oil temperature detection device for detecting a temperature of hydraulic oil to be handled at the hydraulic pump 23, the hydraulic control system 20 is further provided with a hydraulic oil temperature sensor 46 for converting the temperature of the hydraulic oil to an oil temperature detection signal (electrical signal) and outputting the signal to the controller 40. The controller 40 is provided with a temperature determination device 42 set by the control program. This temperature determination device 42 is inputted with the oil temperature detection signal from the hydraulic oil temperature sensor 46, and determines whether or not the temperature of the hydraulic oil as indicated by the oil temperature detection signal is lower than a predetermined temperature.

Incidentally, the viscosity of hydraulic oil depends on its temperature. As the temperature of the hydraulic oil decreases, its viscosity hence increases so that the load upon starting up the diesel engine 21 increases under an effect of the hydraulic pump connected to the diesel engine 21. At the temperature determination device 42, the predetermined temperature which serves as a reference value for the determination of the temperature of the hydraulic oil is set based on whether or not it is a temperature at which the viscosity of the hydraulic oil affects the start-up of the diesel engine 21. The temperature at which the viscosity of the hydraulic oil becomes a load that affects the start-up of the diesel engine 21 can be determined by an experiment or the like.

The hydraulic control system 20 is further provided with a rotary encoder 47 for converting a rotation angle of an output shaft of the diesel engine 21 to a rotation detection signal (electrical signal) and outputting the signal. The controller 40 is provided with a rotational frequency calculation device 43 set by the control program. Based on the rotation angle indicated by the rotation detection signal from the rotary encoder 47, this rotational frequency calculation device 43 calculates the rotational frequency per unit time of the diesel engine 21. The rotary encoder 47 and rotational frequency calculation device 43 make up a rotational frequency detection device for detecting the rotational frequency per unit time of the diesel engine 21 (hereinafter called "the engine rotational frequency").

The controller 40 is also provided with a valve control device 44 set by the control program. This valve control device 44 controls the on/off valve 32 based on the result of detection by the operation detection device 41, the result of determination by the temperature determination device 42, and the result of calculation of the engine rotational frequency by the rotational frequency calculation device 43. Described specifically, when the operation state of the starter 22 has been detected by the operation detection device 41 and the temperature of the hydraulic oil as detected by the hydraulic oil temperature sensor 46 has been determined by the temperature determination device 42 to be a temperature lower than the predetermined temperature, the valve position of the on/off valve 32 is controlled at the closed position until the engine rotational frequency calculated by the rotational frequency calculation device 43 reaches an idling rotational frequency (for example, 800 rpm) set beforehand, but the valve position of the on/off valve 32 is controlled at the open position after the engine rotational frequency calculated by the rotational frequency calculation device 43 has reached the idling rotational frequency (for example, 800 rpm) as the preset rotational frequency set beforehand.

Referring to FIGS. 3A through 3E, a description will be made about operation of the hydraulic control system 20 according to the first embodiment configured as described above. In FIGS. 3A through 3E, solid lines indicate operation when control of the on/off valve 32 is performed to reduce a load acting on the diesel engine 21, while dashed two-dotted lines indicate operation when no control of the on/off valve 32 is performed.

Figure 3A:
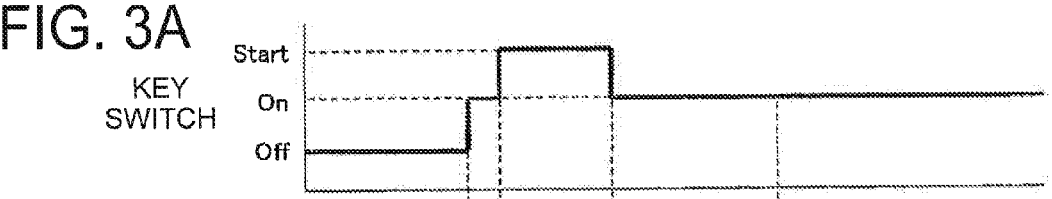
FIGS. 3A through 3E are time charts illustrating operation of the hydraulic control system shown in FIG. 2.
Figure 3B:
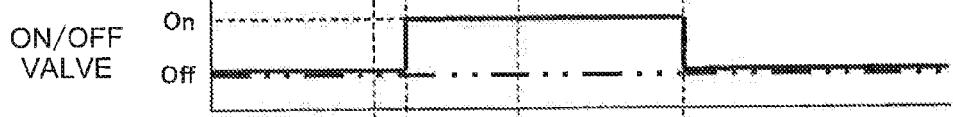

A description will first be made about operation when the on/off valve 32 is used to reduce the load acting on the diesel engine 21. As illustrated in FIG. 3A, when the key switch 45 is manipulated from the off position (Off) to the on position (On) at a time point T1, electric power is fed to the controller 40 to boot up the controller 40. As a consequence, an oil temperature detection signal from the hydraulic oil temperature sensor 46 is inputted to the controller 40, and the temperature determination device 42 of the controller 40 performs a determination as to whether or not the temperature of the hydraulic oil as indicated by the oil temperature detection signal is lower than the predetermined temperature. Now assume that the temperature of the hydraulic oil has been determined to be lower than the predetermined temperature.

When the key switch 45 is next manipulated to the start-up position at a time point T2, the starter 22 is operated. In conjunction with this, the engine rotational frequency begins to increase as indicated by the solid line in FIG. 3C. Further, based on the key switch 45 being in a state of having been manipulated to the start-up position, the operation detection device 41 of the controller 40 detects at the time point T2 that the starter 22 is in an operation state. This time, the temperature of the hydraulic oil has been determined, after an elapse of time from the time point T1, by the temperature determination device 42 to be lower than the predetermined temperature. Therefore, at the timing of the time point T2 at which the operation state of the starter 22 has been detected by the operation detection device 41, the valve control device 44 of the controller 40 outputs a control signal to the on/off valve 32 to switch on the on/off valve 32 and controls the valve position of the on/off valve 32 at the closed position, as indicated by the solid line in FIG. 3B. The valve control device 44 then holds the valve position of the on/off valve 32 at the closed position until the engine rotational frequency calculated by the rotational frequency calculation device 43 reaches the idling rotational frequency (800 rpm) set beforehand.

The on/off valve 32 is arranged in the second line 29 and is interposed between the first line 28 and the second accumulators 26,27. With the valve position of the on/off valve 32 being controlled at the closed position, no pressure oil, therefore, flows from the first line 28 into the second line 29 so that the hydraulic oil delivered from the hydraulic pump 23 driven by the engine 21 is fed to only the first accumulators 24,25 out of the first accumulator 24,25 and second accumulators 26,27. As the pressure (charge pressure) stored in the first accumulator 24,25 rises as indicated by the solid line in FIG. 3E, the delivery pressure (pump pressure) of the hydraulic pump 23 also rises, and accordingly, the load acting on the hydraulic pump 23 becomes greater.

When the key switch 45 is returned from the start-up position to the on position at a time point T3, the starter 22 stops, and the diesel engine 21 starts up to increase the engine rotational frequency by itself. Even in this state, the hydraulic oil delivered from the hydraulic pump 23 is still fed to the first accumulators 24,25, and as a consequence, the charge pressure of the first accumulators 24,25 and the pump pressure reach the a predetermined pressure (20 Mpa) set by the charge valve 30 at a time point T4 as illustrated in FIGS. 3E and 3D. At this time, the charge valve 30 is brought to a state that the pressure in the first line 28 is drained to the hydraulic oil tank 31, and accordingly, the pump pressure drops to a tank pressure (approximately 0 Mpa) as illustrated in FIG. 3D.

Then at a time point T5, the engine rotational frequency reaches the idling rotational frequency (800 rpm). At this time, based on the fact that the engine rotational frequency calculated by the rotational frequency calculation device 43 has reached the idling rotational frequency (800 rpm), the valve control device 44 of the controller 40 stops the output of the control signal to the on/off valve 32, and as illustrated by the solid line in FIG. 3B, switches off the on/off valve 32 and allows the valve position of the on/off valve 32 to return to the open position by the return spring 32a.

When the valve position of the on/off valve 32 returns to the open position at the time point T5 as described above, the hydraulic oil delivered from the hydraulic pump 23 is brought into a state that it is fed from the first line 28 to the second accumulators 26,27 via the second line 29. As an entirety of the first accumulators 24, 25 and second accumulators 26, 27, the charge pressure, therefore, decreases corresponding to the usable capacity of the second accumulators 26,27 (the charge pressure of the first accumulators 24,25 does not decrease). In association with the beginning of feeding of the hydraulic oil, which has been delivered from the hydraulic pump 23, to the second accumulators 26,27 at a time point T6, the pump pressure rises sharply and the charge pressure of the second accumulators 26,27 begins to rise. Then at a time point T7, the charge pressure of the second accumulators 26,27 reaches the predetermined pressure (20 Mpa) set by the charge valve 30. At this time, the charge valve 30 is brought into a state that it drains the pressure in the first line 28 to the hydraulic oil tank 31, and as a consequence, the pump pressure drops to the tank pressure (approximately 0 Mpa).

A description will next be made about operation when the on/off valve 32 is not used. As illustrated by the dashed two-dotted line in FIG. 3B, when the control of the valve position of the on/off valve 32 to the closed position is not performed at the time point T2, in other words, when the valve position of the on/off valve 32 is maintained at the open position, the operation of the starter 22 is performed in parallel with the feeding of the hydraulic oil, which has been delivered from the hydraulic pump 23, to both the first accumulators 24,25 and second accumulators 26,27. As illustrated by the dashed two-dotted lines in FIGS. 3E and 3D, the charge pressure of the entirety of the first accumulators 24,25 and second accumulators 26,27 and the pump pressure begin to rise from the time point T2 and reach the predetermined pressure (20 Mpa), which has been set by the charge valve 30, at a time point T8. On the other hand, as illustrated by the dashed two-dotted line in FIG. 3C, the engine rotational frequency begins to rise from the time point T2, and reaches the idling rotational frequency (800 rpm) at a time point T9.

Figure 3C:
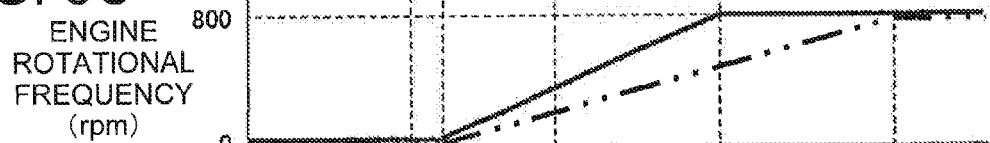
Figure 3D:
Figure 3E:
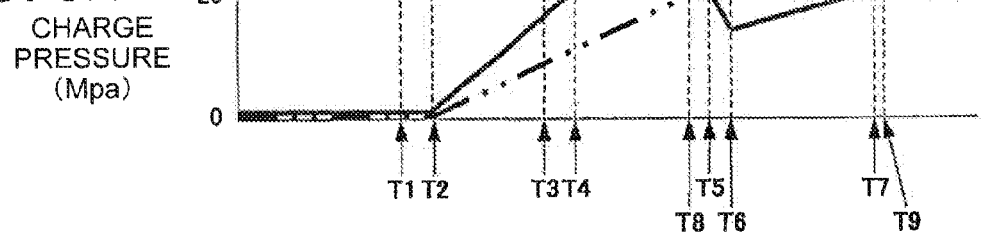

As will be appreciated from a comparison between the patterns of rises in engine rotational frequency as indicated by the solid line and dashed two-dotted line in FIG. 3C, the engine rotational frequency reaches the idling rotational frequency (800 rpm) earlier when the valve position of the on/off valve 32 is controlled to the closed position at the time point T2, in other words, when the hydraulic oil delivered from the hydraulic pump 23 is fed to only the first accumulators 24,25 out of the first accumulators 24, 25 and second accumulators 26,27 than when the control of the valve position of the on/off valve 32 to the closed position is not performed at the time point T2, in other words, when the hydraulic oil delivered from the hydraulic pump 23 is simultaneously fed to both the first accumulators 24,25 and second accumulators 26, 27, because the state that the hydraulic oil delivered from the hydraulic pump 23 is fed to only the first accumulators 24,25 out of the first accumulators 24,25 and second accumulators 26, 27 leads to a smaller load acting on the hydraulic pump 23, and accordingly, to a smaller load acting on the diesel engine 21 than the state that the hydraulic oil delivered from the hydraulic pump 23 is simultaneously fed to both the first accumulators 24,25 and second accumulators 26, 27.

The following advantageous effects can be brought about according to the hydraulic control system 20 of the first embodiment.

By feeding the hydraulic oil, which has been delivered from the hydraulic pump 23, to only the first accumulators 24, 25 out of the first accumulators 24,25 and second accumulators 26,27 until the engine rotational frequency reaches the preset idling rotational frequency (800 rpm) upon starting up the diesel engine 21, the hydraulic control system 20 according to the first embodiment can reduce the load acting on the hydraulic pump 23, and hence, to reduce the load acting on the diesel engine 21 so that the engine can be started up (can reach the idling rotational frequency) quickly.

In the hydraulic control system 20 according to the first embodiment, it is only the second accumulators 26,27 out of the first accumulators 24,25 and second accumulators 26,27 that become unable to be fed with the hydraulic oil delivered from the hydraulic pump 23 when the valve position of the on/off valve 32 is the closed position. Even if the on/off valve 32 should stick at the closed position, the hydraulic oil delivered from the hydraulic pump 23 can, therefore, be still fed to the first accumulators 24,25 although it becomes impossible to feed the hydraulic oil to the second accumulators 26,27. Accordingly, the hydraulic control system 20 according to the first embodiment can reliably perform the feeding of pressure oil from the hydraulic pump 23 to the accumulators.

In the hydraulic control system 20 according to the first embodiment, the valve control device 44 controls the valve position of the on/off valve 32 to the closed position when a temperature of the hydraulic oil lower than the predetermined temperature is detected by the hydraulic oil temperature sensor 46. The predetermined temperature has been set based on whether or not it is a temperature at which the viscosity of the hydraulic oil affects the start-up of the diesel engine 21. When the viscosity of the hydraulic oil does not affect the start-up of the diesel engine 21 upon starting up the engine, the hydraulic control system 20 according to the first embodiment, therefore, allows the second accumulators 26,27 to perform storing pressure oil, without reducing the load acting on the diesel engine 21, by setting the valve position of the on/off valve 32 at the open position instead of the closed position.

Second Embodiment

Figure 4:
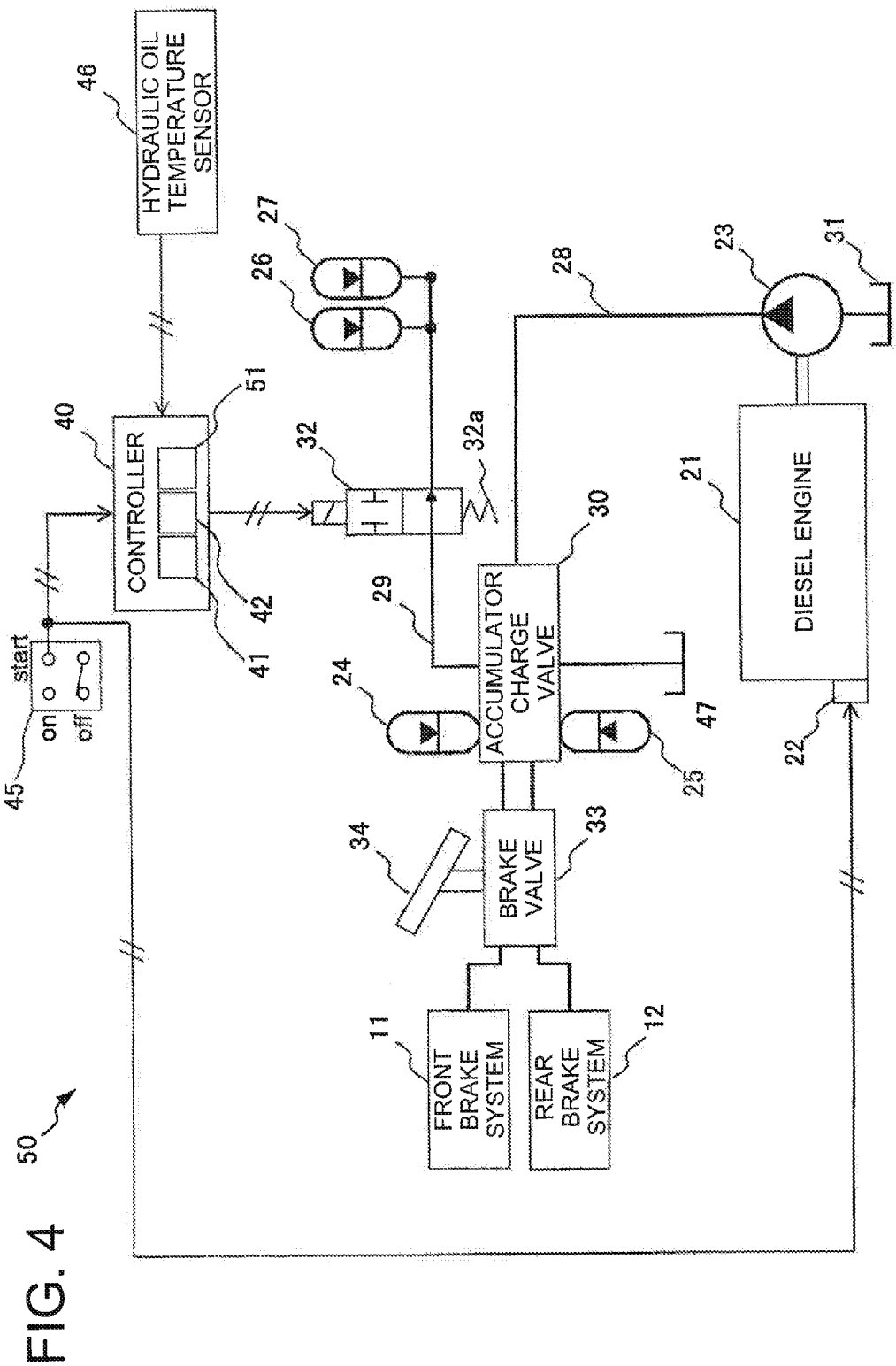
FIG. 4 is a hydraulic circuit diagram showing a hydraulic control system according to a second embodiment of the present invention.

With reference to FIG. 4, a description will be made about the hydraulic control system according to the second embodiment of the present invention for the wheeled working vehicle. Of the elements shown in FIG. 4, those equivalent to the corresponding ones shown in FIG. 2 are indicated by similar signs as those used in FIG. 2.

As shown in FIG. 4, the hydraulic control system 50 according to the second embodiment is different in configuration from the hydraulic control system 20 according to the first embodiment in that it is not provided with the rotary encoder 47 and rotational frequency calculation device 43, in other words, the rotational frequency detection device in the hydraulic control system 20 according to the first embodiment but is provided with a valve control device 51 different from the valve control device 44, and the configuration other than the above-described difference is the same as the corresponding configuration of the hydraulic control system 20 according to the first embodiment.

In the hydraulic control system 50 according to the second embodiment, the valve control device 51 controls the on/off valve 32 based on the result of detection by the operation detection device 41 and the result of determination by the temperature determination device 42. Described specifically, when the operation state of the starter 22 has been detected by the operation detection device 41 and the temperature of the hydraulic oil as detected by the hydraulic oil temperature sensor 46 has been determined by the temperature determination device 42 to be a temperature lower than the predetermined temperature, the valve position of the on/off valve 32 is controlled at the closed position, but otherwise, the valve position of the on/off valve 32 is controlled at the open position.

According to the hydraulic control system 50 of the second embodiment constructed as described above, the valve control device 51 controls the valve position of the on/off valve 32 to the open position at a time point when the starter 22 has returned from the start-up position to the on position. A period of time during which the load acting on the diesel engine 21 is kept reduced upon starting up the diesel engine 21 is, therefore, only while the starter is in the operation state. As a consequence, a time point at which the engine rotational frequency reaches the idling rotational frequency (800 rpm) is later than the time point T5 in the first embodiment in which the valve position of the on/off valve 32 is controlled at the closed position until the engine rotational frequency reaches the idling rotational frequency (800 rpm), but is earlier than the time point T9 when the on/off valve 32 is not controlled to the closed position.

The following advantageous effects can be brought about according to the hydraulic control system 50 of the second embodiment.

By feeding the hydraulic oil, which has been delivered from the hydraulic pump 23, to only the first accumulators 24,25 out of the first accumulators 24,25 and second accumulators 26,27 only while the starter 22 is in the operation state upon starting up the diesel engine 21, the hydraulic control system 50 according to the second embodiment can reduce, compared with the case of the simultaneous feeding of the hydraulic oil, which has been delivered from the hydraulic pump 23, to both the first accumulators 24,25 and second accumulators 26,27, the load acting on the hydraulic pump 23, and hence, to reduce the load acting on the diesel engine 21 so that the engine can be started up (can reach the idling rotational frequency) quickly.

Different from the valve control device 44 in the hydraulic control system 20 according to the first embodiment, the valve control device 51 in the hydraulic control system 50 according to the second embodiment does not make a determination as to whether or not the engine rotational frequency has reached the idling rotational frequency set beforehand. The hydraulic control system 50 according to the second embodiment can, therefore, make a control program for use in the control of the on/off valve 32 simpler than the hydraulic control system 20 according to the first embodiment.

Similar to the hydraulic control system 20 according to the first embodiment, the hydraulic control system 50 according to the second embodiment can reliably perform the feeding of pressure oil from the hydraulic pump 23 to the accumulators. When the viscosity of the hydraulic oil does not affects the start-up of the diesel engine 21 upon starting up the engine, the second accumulators 26,27 are allowed to perform storing pressure oil, without reducing the load acting on the diesel engine 21, by setting the valve position of the on/off valve 32 at the open position instead of the closed position.

The above-described hydraulic control system 20 according to the first embodiment and hydraulic control system 50 according to the second embodiment are provided with the hydraulic oil temperature sensor 46 (hydraulic oil temperature detection device) and temperature determination device 42, and as a condition for controlling the on/off valve 32 at the closed position, require that the temperature of the hydraulic oil is determined by the temperature determination device 42 to be lower than the predetermined temperature. However, the present invention may be provided with neither a hydraulic oil temperature determination device nor a temperature determination device, in other words, may not require, as a condition for the control of the on/off valve 32, that the temperature of the hydraulic oil is the predetermined temperature.

Concerning the above-described hydraulic control system 20 according to the first embodiment and hydraulic control system 50 according to the second embodiment, no description has been made about the proportion of a total capacity of the first accumulators 24, 25, which accounts for a total capacity of the first accumulators 24, 25 and second accumulators 26,27. The total capacity of the first accumulators 24,25 may be a capacity that can actuate each of the front brake system 11 and rear brake system 12 a predetermined number of times which is once or more, and may be set smaller than a total capacity of the second accumulators 26,27. As a consequence, upon feeding the hydraulic oil, which has been delivered from the hydraulic pump 23, to only the first accumulators 24,25 out of the first accumulators 24,25 and second accumulators 26,27, the load acting on the diesel engine 21 can be reduced without decreasing the total capacity of the first accumulators 24,25 and second accumulators 26,27.

The wheeled working vehicle, to which the above-described hydraulic control system 20 according to the first embodiment and hydraulic control system 50 according to the second embodiment are each applied, is a wheeled hydraulic excavator. It is, however, to be noted that the wheeled working vehicle to which the present invention is applicable is not limited to a wheeled hydraulic excavator but may be another wheeled working vehicle such as a wheel loader.

LEGEND

1 Wheeled hydraulic excavator
11 Front brake system
12 Rear brake system
20 Hydraulic control system
21 Diesel engine
22 Starter
23 Hydraulic pump
24, 25 First accumulators
26, 27 Second accumulators
28 First line
29 Second line
30 Accumulator charge valve
31 Hydraulic oil tank
32 On/off valve
32a Return spring
33 Brake valve
34 Brake pedal
40 Controller
41 Operation detection device
42 Temperature determination device
43 Rotational frequency calculation device
44 Valve control device
45 Key switch
46 Hydraulic oil temperature sensor
47 Rotary encoder
50 Hydraulic control system
51 Valve control device

The invention claimed is:

1. A hydraulic control system for a wheeled working vehicle provided with an engine, a starter for starting up the engine, a hydraulic pump drivable by the engine, an accumulator for storing pressure oil therein by being fed with hydraulic oil delivered from the hydraulic pump, a brake system for applying braking to wheels by the pressure oil stored in the accumulator, and a brake valve for controlling the pressure oil to be fed to the brake system, wherein:

the hydraulic control system is provided with:

a first accumulator connected, as the accumulator, to a first line connecting the hydraulic pump and the brake valve to each other, a second accumulator connected, as the accumulator, to a second line branching from the first line at a point between the hydraulic pump and the first accumulator, an operation detection device for detecting whether or not the starter is in an operation state, a rotational frequency detection device for detecting a rotational frequency of the engine, an on/off valve arranged in the second line and switchable in valve position to an open position, where the first line and the second accumulator are communicated to each other, or a closed position, where the first line and the second accumulator are cut off from each other, and a valve control device for controlling the on/off valve based on the operation state of the starter as detected by the operation detection device and the rotational frequency of the engine as detected by the rotational frequency detection device; and upon detection of the operation state of the starter by the operation detection device, the valve control device controls the valve position of the on/off valve at the closed position until the rotational frequency of the engine as detected by the rotational frequency detection device reaches a preset rotational frequency set beforehand, but controls the valve position of the on/off valve at the open position after the rotational frequency of the engine has reached the preset rotational frequency.

2. The hydraulic control system according to claim 1, wherein:

the hydraulic control system is further provided with a hydraulic oil temperature detection device for detecting a temperature of the hydraulic oil delivered from the hydraulic pump and a temperature determination device for determining whether or not the temperature detected by the hydraulic oil temperature detection device is lower than a predetermined temperature; and the valve control device controls the valve position of the on/off valve at the closed position when the operation state of the starter has been detected by the operation detection device and the temperature of the hydraulic oil has been determined to be lower than the predetermined temperature by the temperature determination device.

3. The hydraulic control system according to claim 2, wherein:

a proportion of a capacity of the first accumulator, which accounts for a total capacity of the first and second accumulators, is in a range that the capacity of the first accumulator can actuate the hydraulic brake system a predetermined number of times which is once or more, and is set smaller than a proportion of a capacity of the second accumulator, which accounts for the total capacity.

4. The hydraulic control system according to claim 1, wherein:

a proportion of a capacity of the first accumulator, which accounts for a total capacity of the first and second accumulators, is in a range that the capacity of the first accumulator can actuate the hydraulic brake system a predetermined number of times which is once or more, and is set smaller than a proportion of a capacity of the second accumulator, which accounts for the total capacity.

5. A hydraulic control system for a wheeled working vehicle provided with an engine, a starter for starting up the engine, a hydraulic pump drivable by the engine, an accumulator for storing pressure oil therein by being fed with hydraulic oil delivered from the hydraulic pump, a brake system for applying braking to wheels by the pressure oil stored in the accumulator, and a brake valve for controlling the pressure oil to be fed to the brake system, wherein:

the hydraulic control system is provided with:

a first accumulator connected, as the accumulator, to a first line connecting the hydraulic pump and the brake valve to each other, a second accumulator connected, as the accumulator, to a second line branching from the first line at a point between the hydraulic pump and the first accumulator, an operation detection device for detecting whether or not the starter is in an operation state, an on/off valve arranged in the second line and switchable in valve position to an open position, where the first line and the second accumulator are communicated to each other, or a closed position, where the first line and the second accumulator are cut off from each other, and a valve control device for controlling the on/off valve based on the operation state of the starter as detected by the operation detection device; and the valve control device controls the valve position of the on/off valve at the closed position upon detection of the operation state of the starter by the operation detection device, but controls the valve position of the on/off valve at the open position while the operation state of the starter is not detected.

6. The hydraulic control system according to claim 5, wherein:

the hydraulic control system is further provided with a hydraulic oil temperature detection device for detecting a temperature of the hydraulic oil delivered from the hydraulic pump and a temperature determination device for determining whether or not the temperature detected by the hydraulic oil temperature detection device is lower than a predetermined temperature; and the valve control device controls the valve position of the on/off valve at the closed position when the operation state of the starter has been detected by the operation detection device and the temperature of the hydraulic oil has been determined to be lower than the predetermined temperature by the temperature determination device.

7. The hydraulic control system according to claim 6, wherein:

a proportion of a capacity of the first accumulator, which accounts for a total capacity of the first and second accumulators, is in a range that the capacity of the first accumulator can actuate the hydraulic brake system a predetermined number of times which is once or more, and is set smaller than a proportion of a capacity of the second accumulator, which accounts for the total capacity.

8. The hydraulic control system according to claim 5, wherein:

a proportion of a capacity of the first accumulator, which accounts for a total capacity of the first and second accumulators, is in a range that the capacity of the first accumulator can actuate the hydraulic brake system a predetermined number of times which is once or more, and is set smaller than a proportion of a capacity of the second accumulator, which accounts for the total capacity.

* * * * *